United States Patent [19]

Hochmuth et al.

[11] 4,074,949

[45] Feb. 21, 1978

[54] CUTTING TOOL

[75] Inventors: Walter Hochmuth, Nuremberg; Hans Peter Hollfelder, Furth, Bay, both of Germany

[73] Assignee: Robert Zapp, Werkzeug-und Maschinenfabrik GmbH, Stuttgart, Germany

[21] Appl. No.: 615,073

[22] Filed: Sept. 19, 1975

[51] Int. Cl.² .............................................. B26D 1/00
[52] U.S. Cl. ..................................... 407/114; 407/100
[58] Field of Search .................................. 29/96, 95 R

[56] References Cited

U.S. PATENT DOCUMENTS

| 3,142,110 | 7/1964 | Hertel | 29/96 |
| 3,289,271 | 12/1966 | Stier | 29/96 X |
| 3,490,117 | 1/1970 | Hertel | 29/96 |
| 3,887,975 | 6/1975 | Sorice et al. | 29/95 X |

FOREIGN PATENT DOCUMENTS 1,246,360   8/1967   Germany ............................. 29/96

Primary Examiner—Leonidas Vlachos
Attorney, Agent, or Firm—Haseltine, Lake & Waters

[57] ABSTRACT

A cutting tool for metal cutting with a cutter having parallel base surfaces and grooves machined into the side surfaces, forming cutting edges, which can be inserted into the recesses of a tool holder. The cutting tool has a center bore for accommodating a clamping element and is made from a parallelepiped-shaped base body with rectangular and preferably square sides wherein the base edges of grooves successively run in the direction of a diagonal of the side surfaces of a parallelepiped similar to the parallelepiped-like base body inscribed so that the base surfaces of the cutter are rhombic.

12 Claims, 7 Drawing Figures

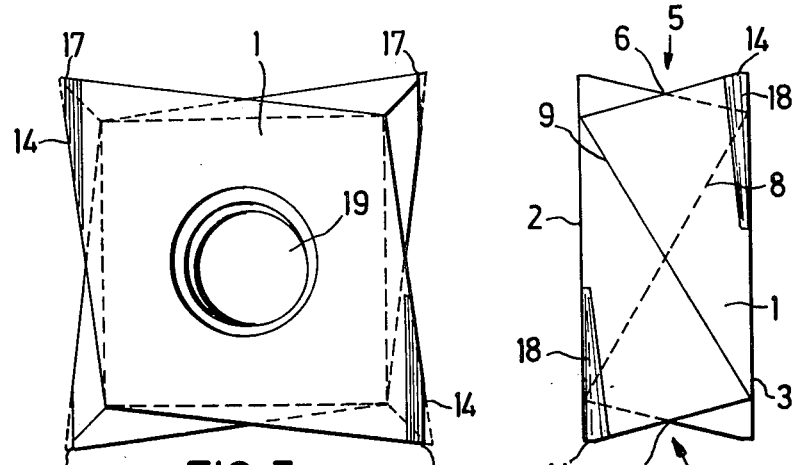
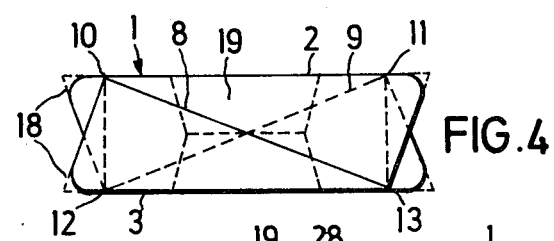
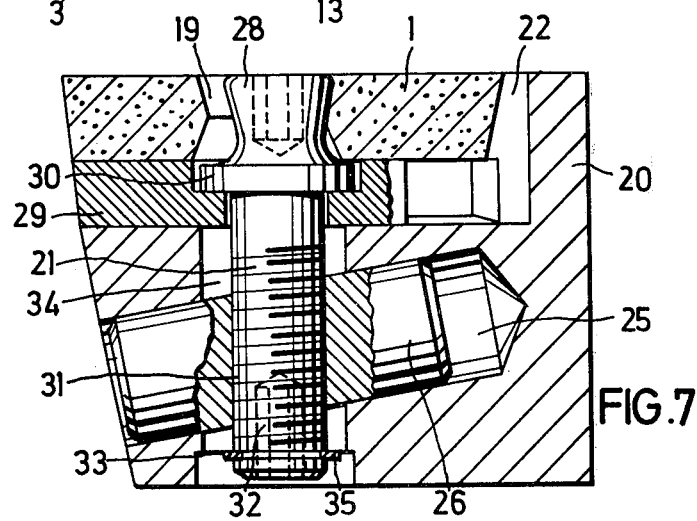

CUTTING TOOL

BACKGROUND OF THE INVENTION

The present invention relates to a cutting tool for metal cutting with a cutter with parallel base surfaces and grooves machined into the side surfaces, forming cutting edges. This cutter can be inserted into the recesses of a tool holder, has a center bore for accommodating a clamping element, and is made from a parallelepiped-shaped base body with rectangular and preferably square sides.

The invention is based on the concept that there are known in the art metal-cutting tools consisting of a support or holding body which is mounted adjustably in the support of a machine tool facing the workpiece to be machined. The actual cutter, has one or several cutting edges for the removal of chips, and is mounted in a disconnectable manner on the free end of this tool holder. The shape of the cutter, in particular its geometry, corresponds to the machining operation to be performed.

In one of these known embodiments of cutting tools, the cutter has the form of two truncated pyramids attached by their top surfaces with the square base surfaces parallel to each other; their outside edges may run parallel or may form an angle of up to 10° with one another, depending on how the associated cutting tool is to be used.

For example, it is absolutely necessary that the truncated-pyramid-like cutter halves are displaced by a certain angle relative to one another if one wants to prevent that the cutter base surface comes in contact with the machined workpiece when turning right-angle shoulders.

Since, however, the amount of displacement angle, depending on the desired chip formation, must be different, the use of these known cutters requires the holding in readiness of such cutters with displacement angles of varying size. It also requires the use of differently shaped tool holders, in view of the arrangement of the recess walls (serving as supporting surfaces) or the use of two additional supports with curved outside surfaces, mounted on the tool holder. In addition, their manufacture, due to the number and mutual alignment of numerous ways of grinding is very cumbersome.

It is, therefore, an object of the present invention to provide a cutter which has four positive edges with which the operations turning, milling and copying can be carried out precisely without damage to the cutting edges used, when using the same cutter tool holder. Its geometry permits the simple manufacture of a left-hand or right-hand cutter, each with four positive cutting edges, from the same blank.

Another object of the present invention is to provide a cutter of the foregoing character which may be simply fabricated and have a long service life.

SUMMARY OF THE INVENTION

The objects of the present invention are achieved by providing a cutting tool of the initially mentioned type, the base edges of the grooves successively run in the direction of a diagonal of the side surfaces of a parallelepiped similar to the parallelpiped-like base body inscribed, in such a way that the base surfaces of the cutter are rhombic.

Such a cutter can be used with all milling and lathe work, especially with copying operations, and can be manufactured economically, since its shape makes it possible to make from the same blank, right-hand or left-hand positive cutters as required, starting with a blank in the form of a plane-parallel plate with square base surface. After machining the grooves, one obtains a cutter whose facing base surfaces are always rhombic, making sure that the side steel tool cuts freely even when being used for turning right-angle shoulders.

Furthermore, the cutter in accordance with the present invention can be ground on the periphery with great precision and for this reason can be used for milling (shaper) cutters.

The grooves of the cutter may have a triangular cross section or their cross section may be curved.

In accordance with the present invention, the side edges, meeting at an angle of less than 90°, of the rhombic base surfaces of the cutter, always form two diagonally facing cutting tips. These are preferably provided with a tip radius. Only when providing the tip radii to the cutting edges it is established whether the blank, provided with grooves, is to be used as right-hand or left-hand cutter. Of course, the grooves need not necessarily be ground into a parallelepiped-shaped base body, but can also be placed in a different way in particular, by sintering.

In a preferred embodiment of the present invention, the surfaces forming a cutting edge subtend an angle of 55°. Such a cutter is particularly well suited for copy turning.

In an additional embodiment of the present invention, the positive side surfaces, serving as chip removal surfaces are equipped with chip steps to achieve that the chips break off at short length.

In order to safeguard the vibration-free, fracture-resistant mounting of the cutter, a further embodiment of the present invention provides that the cutter has a central hole with conic countersinks on both base surfaces to accommodate a clamping element for the force-locked mounting of the cutter in the tool holder. The cutter is fastened in a recess of a tool holder in such a way that with sections of its side surfaces acting as true rakes, it is supported by corresponding undercut walls of this recess against the cutting pressure. With this arrangement of the cutter in the tool holder it is held securely, with the contact surfaces between cutter and tool simultaneously taking the three cutting pressure components occurring during lathe turning. Furthermore, it is assured that the cutting edges not being used, are embedded in the tool holder, protected against damage.

Furthermore perfect operation of the cutting tool in accordance with the present invention can be assured by the fact that, if necessary, the cutter is fastened to the tool holder in such a way that the cutting edge in question is parallel to the contact surface of the tool holder.

A further embodiment of the present invention provides that the cutting edge of the cutting tool and the adjacent outside edge of the tool holder make preferably an angle of 6° with one another so that one can always cut freely with the tool in accordance with the present invention.

The novel features which are considered as characteristic for the invention are set forth in particular in the appended claims. The invention itself, however, both as to its construction and its method of operation, together with additional objects and advantages thereof, will be best understood from the following description of spe-

BRIEF DESCRIPTION OF THE DRAWING

FIG. 4 shows the top view of a cutter without holder;

FIG. 5 shows the front view of the arrangement of FIG. 4;

FIG. 6 is a side view taken in the direction of the left-hand arrow of FIG. 5; and FIG. 7 shows a section of an embodiment of a mounting of the cutter taken along line VII—VII of FIG. 2.

DESCRIPTION OF THE PREFERRED EMBODIMENTS

Figure 1:
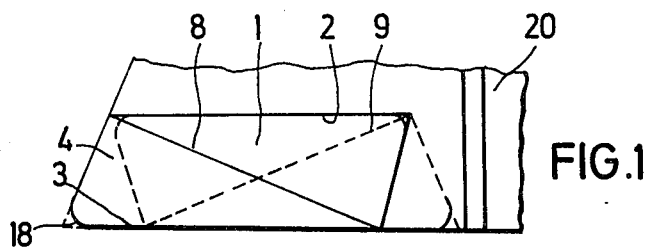
FIG. 1 is a top view of a cutter held in the tool shank in the direction of the upper arrow of FIG. 2.

The cutter 1 produced by grinding from an unfinished piece made by form sintering has the shape of a plate with rhombic base surfaces 2, 3 arranged parallel to each other. In side surfaces 4, grooves 5 are ground or sintered and reground in such a way that the base edges 6, 7 of these grooves 5 run in the direction of one of the two diagonals 8, 9 which connect the corners 10, 11, 12, 13 of the side surfaces 4 of a parallelpiped inscribed in the parallelepiped-like unfinished piece. With the embodiment shown, these ground surfaces forming grooves 5 are plane so that they appear triangular in cross section. However, the ground surfaces may also be curved.

By grinding the grooves 5 with a diagonal course, there appears a cutter 1 whose base surfaces 2, 3 are rhombic and are displaced relative to each other by a certain angle. The lines of intersection between base surfaces 2, 3 and the ground surfaces of grooves 5 form cutting edges 14. The surfaces joined at cutting edge 14 are inclined at an angle of 55° relative to one another. The positive surfaces resulting from grinding, form the true rakes 15 of cutter 1 into which the cutting steps 16 are ground. At the corners of cutter 1 where the side edges of its base surfaces 2, 3 meet at an angle of less than 90°, there are located the cutting tips 17, two of which face each other at each base surface. The cutting edges 14 are provided with a tip radius 18 in a manner already known in the art.

The cutter 1 contains a center bore 19 whose exit location is provided at the base surfaces 2, 3 with a conic countersink.

In the operating condition, the cutter 1 of the cutting tool is held in the tool holder 20 by means of a mounting element 21, passing through its bore (drillhole) 19, in a recess 22 provided on the free end of the tool holder 20. The cutter 1 with sections 23 of its side surface acting as true rakes 15 is in contact with the walls of this recess 22. These walls take the force components occurring when using the cutting tool. Recess 22 increases in the direction toward the clamped end of the tool holder, so that the part of the cutter 1 pointing in the clamping direction is surrounded by area 24 of the recess and lies freely therein.

In the loosened condition, the clamping element 21, together with the bolt 26 located in hole 25 is displaced against the clamping direction, so that the cutter 1 can be placed over the head 28 of the clamping element 21. By turning the clamping element 21 inwards, the bolt 26 is moved in the clamping direction. As a result, head 28 of the clamping element 21 touches hole 19 and the cutter 1 makes contact with three surfaces in the recess 22 of the tool holder. Base support 29 of cutter 1 is held by rod stop (collar) 30 of clamping element 21. With the preferred upright-position of cutter 1 on the side of tool holder 20, base support 29 can, of course, be dispensed with.

In order to loosen the clamping of cutter 1, the threaded bolt 32 passing through the threaded hole 31 of bolt 26 is turned in the opposite direction. The snap ring 35 resting against bearing surface 33 of oblong hole 34 prevents clamping element 21 from turning out from bolt 26 and drives it against the clamping direction 27, which necessarily leads to the release of cutter 1.

Figure 2:
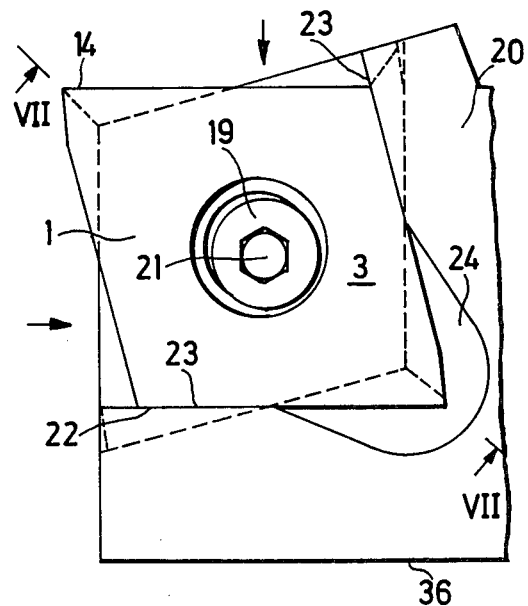
FIG. 2 shows the front view of this arrangement.
Figure 3:
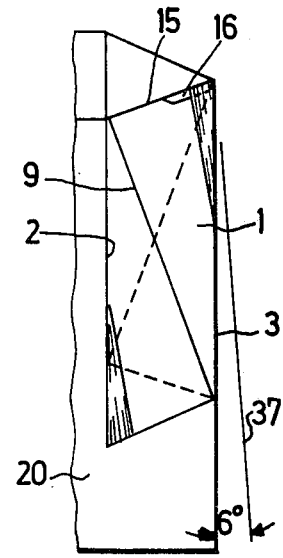
FIG. 3 shows its side view in the direction of the left-hand arrow of FIG. 2.

As can be seen from FIG. 2 and 3, cutter 1 is fastened upright in the tool holder. The cutting edge 14, which is in the operating position, is parallel to the bearing surface 36 of tool holder 20 and at an angle of 6° with the adjacent outside edge 37 of the tool holder.

The shape of the cutter and its attachment has been described on the basis that the cutter is made from a plate with square base. However, one could also use a plate whose sides are of different lengths as starting blank. In this case, after machining the grooves, one obtains a cutter 1 with sides of varying lengths of the two base surfaces 2, 3 which are always of rhombic shape assuring free cutting of the tool.

Without further analysis, the foregoing will so fully reveal the gist of the present invention but others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. A cutting tool arrangement for metal cutting comprising, in combination, a base body having parallel base surfaces and grooves machined into the side surfaces for forming cutting edges, said cutting tool being insertable into recesses of a tool holder and having a center bore; said base body having rhombic-shaped cross-sections parallel to said base surfaces and having V-shaped sides formed by relief surfaces intersecting in a line between said parallel base surfaces, said parallel base surfaces of said base body being rhombic-shaped with vertices, said line extending along one side of said base body, said line extending from one vertex of one parallel base surface to a predetermined vertex on the opposite parallel base surface, said predetermined vertex lying diagonally opposite said one vertex, said predetermined vertex lying also opposite a vertex on said one base surface adjacent to said one vertex, said line extending along one side intersecting at both ends with lines on adjacent sides, said lines being interconnected in sequence and forming a rhombus in a plane inclined to the planes of said parallel base surfaces, said lines forming base edges of said grooves.

2. The cutting tool as defined in claim 1 wherein said parallelepiped-shaped base body has square sides.

3. The cutting tool as defined in claim 1 wherein said grooves have a triangular cross section.

4. The cutting tool as defined in claim 1 wherein said grooves have a curved cross section.

5. The cutting tool as defined in claim 1 wherein the sides of the rhombic base surfaces intersect at an angle of less than 90° and form two diagonally facing cutting tips, said cutting tips having a tip radius.

6. The cutting tool as defined in claim 1 wherein the surfaces forming a cutting edge subtend substantially an angle of 55°.

7. The cutting tool as defined in claim 1 wherein positive side surfaces of said cutting tool have chip steps for chip removal, said positive side surfaces comprising chip removal surfaces.

8. The cutting tool as defined in claim 1 wherein said cutting tool has a central bore with conic countersinks on both base surfaces for receiving a clamping element to force-lock said tool in a tool holder.

9. The cutting tool as defined in claim 1 including a tool holder with a recess, said cutting tool being fastened in said recess of said tool holder, sections of side surfaces of said cutting tool comprising true rakes, said recess of said tool holder having undercut walls, said cutting tool being supported by undercut walls of said recess against cutting pressure.

10. The cutting tool as defined in claim 9 wherein said cutting tool is fastened to said tool holder so that the cutting edge of said cutting tool is substantially parallel to the contact surface of said tool holer.

11. The cutting tool as defined in claim 9 wherein the cutting edge of said cutting tool and the adjacent outside edge of said tool holder form an angle of substantially 6°.

12. The cutting tool as defined in claim 1 wherein the sides of the rhombic base surfaces of said cutting tool intersect at an angle at less than 90° and form two diagonally facing cutting tips, said cutting tips having a tip radius, the surfaces forming a cutting edge subtending substantially an angle of 55°, positive side surfaces of said cutting tool having chip steps for chip removal, said positive side surfaces comprising chip removal surfaces, said cutting tool having a central bore with conic countersinks on both base surfaces for receiving a clamping element to force-lock said cutting tool in said tool holder, said cutting tool being fastened in a recess of said tool holder, sections of the side surfaces of said cutting tool comprising true rakes, said recess of said tool holder having undercut walls, said cutter being supported by undercut walls of said recess against cutting pressure, said cutting tool being fastened to said tool holder so that the cutting edge of said cutter is substantially parallel to the contact surface of said tool holder, the cutting edge of said cutting tool and the adjacent outside edge of said tool holder forming an angle of substantially 6°.

* * * * *